US012594843B2

(12) United States Patent
Patel et al.

(10) Patent No.: US 12,594,843 B2
(45) Date of Patent: Apr. 7, 2026

(54) ACTIVE DAMPING CONTROL WITHIN A SUPERVISORY CONTROL STRUCTURE

(71) Applicant: FCA US LLC, Auburn Hills, MI (US)

(72) Inventors: Nadirsh D Patel, Auburn Hills, MI (US); Cristian Rostiti, Auburn Hills, MI (US); McKenzie Walsh, Auburn Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 108 days.

(21) Appl. No.: 18/753,136

(22) Filed: Jun. 25, 2024

(65) Prior Publication Data

US 2025/0388091 A1      Dec. 25, 2025

(51) Int. Cl.
*B60L 15/20* (2006.01)

(52) U.S. Cl.
CPC ......... *B60L 15/20* (2013.01); *B60L 2240/423* (2013.01)

(58) Field of Classification Search
CPC ........................... B60L 15/20; B60L 2240/423
See application file for complete search history.

(56) References Cited

U.S. PATENT DOCUMENTS

| | | | |
|---|---|---|---|
| 2013/0030626 A1* | 1/2013 | Patel ...................... | B60K 6/445 |
| | | | 903/930 |
| 2023/0046357 A1* | 2/2023 | Jaccoud ................ | B60W 10/06 |
| 2024/0025407 A1* | 1/2024 | Tuller ................... | B60W 50/06 |

* cited by examiner

*Primary Examiner* — Behrang Badii
(74) *Attorney, Agent, or Firm* — Jeremy J. Klobucar

(57) ABSTRACT

An electrified powertrain that generates and transfers drive torque to a driveline of a hybrid electric vehicle includes a first electric motor, a second electric motor and a controller. The first electric motor includes a first electric motor output. The second electric motor includes a second electric motor output. The controller is configured to: receive a driver torque request; determine an open loop motor torque command based on the driver torque request; and determine a shaped torque command based on the open loop motor torque command, including identifying a lash zone, requesting motor torque from at least one of the first and second electric motors to cross the lash zone, and, subsequent to crossing the lash zone, providing motor torque to meet the driver torque request.

15 Claims, 7 Drawing Sheets

Driver Demand Reference Trajectory
Traditional non-linear Driver Demand Filtering
Model-based Control

ACTIVE DAMPING CONTROL WITHIN A SUPERVISORY CONTROL STRUCTURE

FIELD

The present application generally relates to hybrid electric vehicles and, more particularly, to a system and method for active damping control in a hybrid vehicle.

BACKGROUND

A hybrid electric vehicle includes an internal combustion engine (ICE), at least one high-voltage battery system and at least one electrified drive module having an electric motor and associated electric drive gearbox assembly. The ICE and electric motor(s) can be generally referred to as prime movers. To effectively manage the efficiencies of these prime movers, they require to be connected and disconnected to the driveline. Due to the complexity of the multiple paths, the driveline tends to have additional lash in the torque path as compared to conventional ICE drivelines. When inherent lash and stiffness of the driveline are not considered, the resulting command can lead to vibrations and oscillations in the powertrain, reducing performance and comfort. This lash needs to be controlled. Accordingly, while such hybrid powertrains do work well for their intended purpose, there is a desire for improvement in the relevant art.

SUMMARY

According to one example aspect of the invention, an electrified powertrain that generates and transfers drive torque to a driveline of a hybrid electric vehicle includes a first electric motor, a second electric motor and a controller. The first electric motor includes a first electric motor output. The second electric motor includes a second electric motor output. The controller is configured to: receive a driver torque request; determine an open loop motor torque command based on the driver torque request; and determine a shaped torque command based on the open loop motor torque command, including identifying a lash zone, requesting motor torque from at least one of the first and second electric motors to cross the lash zone, and, subsequent to crossing the lash zone, providing motor torque to meet the driver torque request.

In some implementations, the controller is further configured to perform closed loop active electric motor damping of at least one of the first and second electric motors.

In some implementations, the controller further comprises a supervisory motor torque determination module that (i) receives a driver demand shaping signal based on the driver torque request and (ii) an engine torque signal.

In some implementations, the supervisory motor torque determination module further comprises an active damping controller that (i) receives the open loop motor torque command and (ii) outputs the shaped torque command to at least one of the first and second electric motors.

In additional features, the controller further includes a motor controller including an active electric motor dampening (AEMD) module that receives the shaped torque command and outputs modified torque actuation signals to the respective first and second electric motors.

In additional features, the motor controller implements a closed loop speed control that mitigates residual oscillations in the electrified powertrain.

In additional features, the electrified powertrain further comprises a supervisory motor torque determination module implements a linear quadratic integral (LQI)-based compensator that provides the shaped torque command.

In additional features, the electrified powertrain further comprises an internal combustion engine (ICE).

In additional features, a method for controlling an electrified powertrain that generates and transfers drive torque to at least one of a first and second electric motor in a driveline of a hybrid electric vehicle in provided. The method includes: receiving a driver torque request; determining an open loop motor torque command based on the driver torque request; determining a shaped torque command based on the open loop motor torque command, including identifying a lash zone; and requesting motor torque from at least one of the first and second electric motors to cross the lash zone, and, subsequent to crossing the lash zone, providing motor torque to meet the driver torque request.

In additional features, the method includes performing closed loop active electric motor damping of at least one of the first and second electric motors In additional features, the method includes receiving, at a supervisory motor torque determination module, (i) a driver demand shaping signal based on the driver torque request and (ii) an engine torque signal.

In additional features, the method includes receiving, at an active damping controller, the open loop motor torque command; and outputting the shaped torque command to at least one of the first and second electric motors.

In additional features, the method includes: receiving, at a motor controller including an active electric motor dampening (AEMD) module, the shaped torque command; and outputting modified torque actuation signals to the respective first and second electric motors.

In additional features, the method includes implementing a closed loop speed control that mitigates residual oscillations in the electrified powertrain.

In additional features, the method includes implementing, at a supervisory motor torque determination module, a linear quadratic integral (LQI)-based compensator that provides the shaped torque command.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

Figure 1:
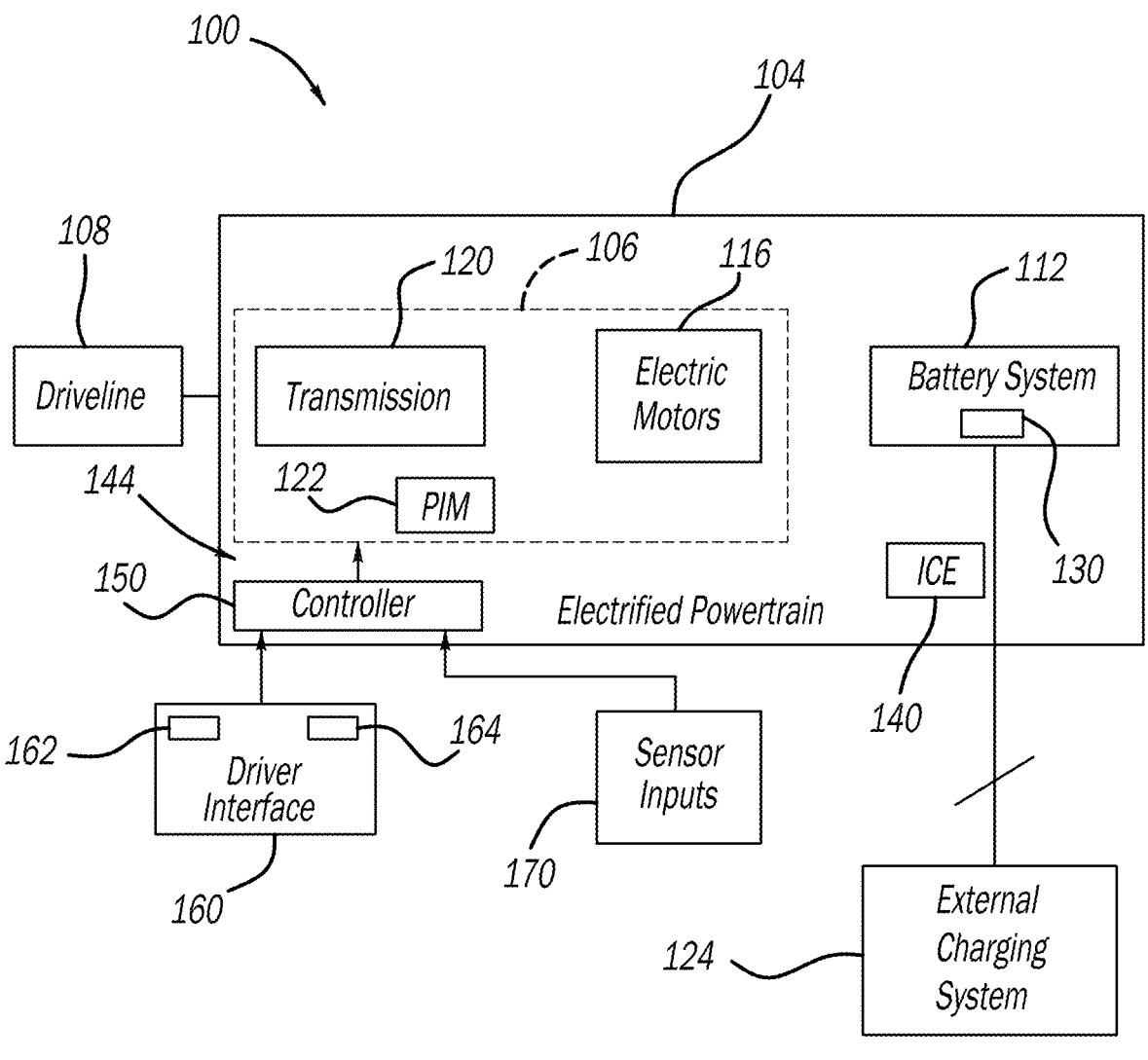
FIG. 1 is a functional block diagram of a hybrid electric vehicle that implements a system and method for active damping control according to various principles of the present application.

As mentioned above, it is desirable to effectively manage the efficiencies of prime movers that are repeatedly connected and disconnected to the vehicle driveline in a hybrid powertrain. Due to the complexity of the multiple paths, the driveline tends to have additional lash in the torque path as compared to conventional ICE drivelines.

The present disclosure provides a novel system and method for controlling and actuating vibrations and torque noises in hybrid and electric vehicles due to flexible shafts and backlash within the drivetrain components. In particular, the present disclosure provides a model-based control technique based on a linear quadratic gaussian (LQG) formulation. The model-based control includes a linear-switching model of the driveline where the states and formulations are properly chosen to facilitate calibration of the control strategy. A rigid model is used to generate references when in contact. A physic-based reference logic is used to generate references when in the lash zone. A linear Kalman Filter is used to estimate the state of the system (contact, no-contact). A gain scheduling approach wherein the gains change depending upon the state of the system is used. The states of the system can include all parts in contact, some parts in lash, all parts in lash, etc. A linear Quadratic Integral (LQI) controller with a gain scheduling approach is provided. The LQI controller takes the estimated states, compares them to the reference states, and generates torque commands to prevent and compensate for any oscillations/vibrations within the system.

The supervisory control described herein optimizes multiple actuators and minimizes computational complexity. The control method simplifies the powertrain down to the minimum states it requires for optimization purposes. This results in the control not accounting for non-linearities and stiffness, which results in the generation of the optimum torque commands with a minimum computational burden. A model-based controller of a hybrid powertrain is disclosed that, in response to a driver-demanded reference trajectory, appropriately commands the electric machines as actuators, while accounting for the complex dynamics of the entire system plant. These dynamics encompass additional system states when considering stiffness and damping of the powertrain and incorporate nonlinearities, such as backlash, which introduces challenges into the control process.

Traditional torque control methodologies often employ torque shaping techniques that involve the use of nonlinear filters to modify the reference torque desired, especially in response to the lash zone, a region associated with backlash. Such filters conventionally introduces a deliberate delay in torque commands as they traverse the lash zone, releasing torque aggressively once the zone is traversed (explained in greater detail herein with respect to FIG. 2). Such an approach, derived from the context of internal combustion engines, may not be ideal for electric vehicles, which lack the inherent delays associated with the combustion process.

Figure 4:
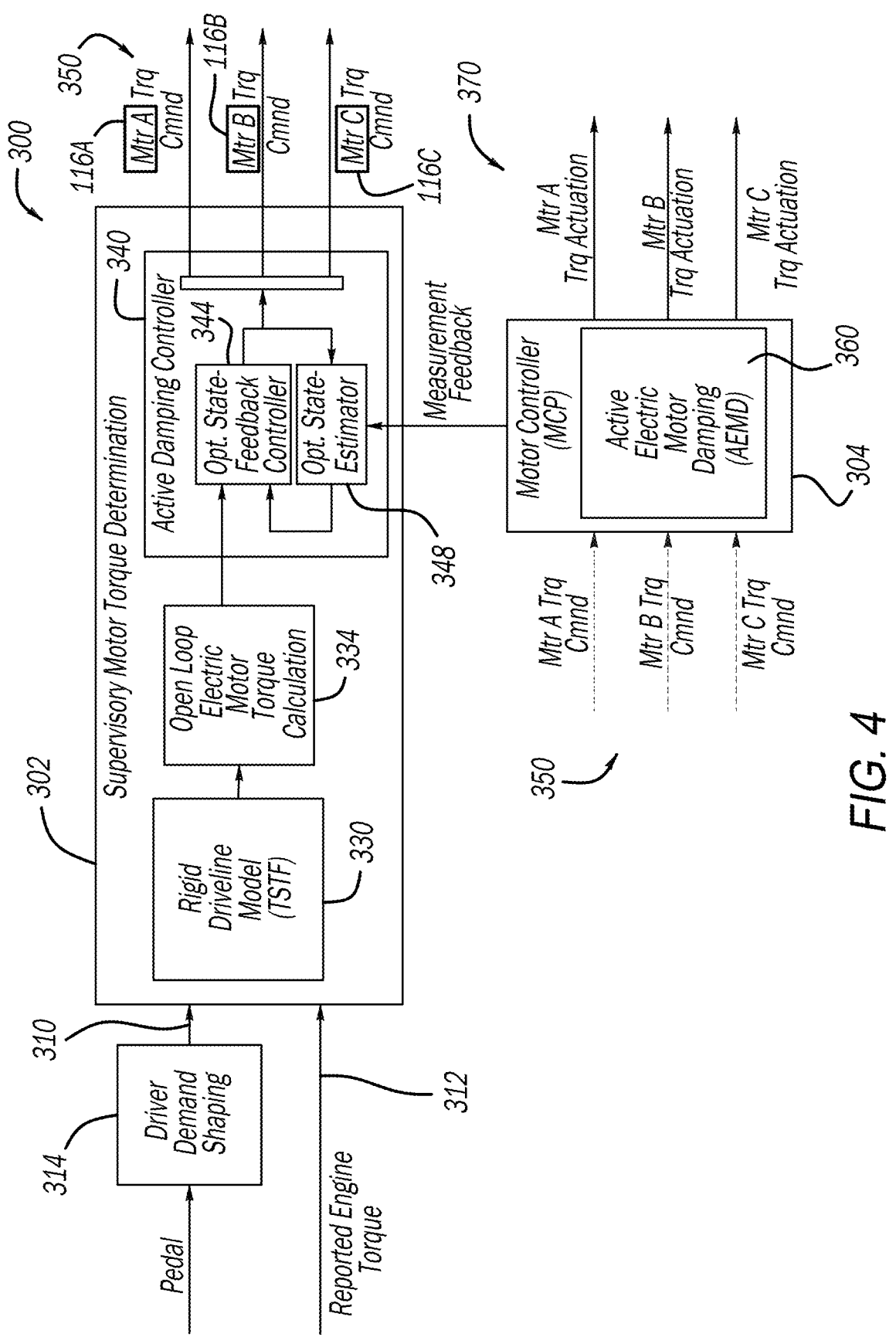
FIG. 4 is a functional block diagram of a supervisory motor torque control implemented by the controller of the hybrid electric vehicle of FIG. 1 according to one example of the present disclosure.

Referring now to FIG. 1, a functional block diagram of an example hybrid electric vehicle 100 (also referred to herein as "vehicle 100") according to the principles of the present application is illustrated. The vehicle 100 includes an electrified powertrain 104 having an electrified drive module (EDM) 106 configured to generate and transfer drive torque to a driveline 108 for vehicle propulsion. The EDM 106 generally includes one or more electric drive units or motors 116 (e.g., electric traction motors), an electric drive gearbox assembly or transmission 120, and power electronics including a power inverter module (PIM) 122. As will become appreciated herein, the exemplary powertrain 104 includes a first electric motor 116A, a second electric motor 116B, and a third electric motor 116C (FIG. 4). It is appreciated that while the example discussed herein provides three electric motors, the teachings are equally adapted for electric motor combinations less than or more than three. The transmission 120 is configured as a four speed EVT.

The electric motors 116 are connected via the PIM 122 to a high voltage battery system 112 for powering the electric motors 116. The battery system 112 is selectively connectable (e.g., by the driver) to an external charging system 124 (also referred to herein as "charger 124") for charging of the battery system 112. The battery system 112 includes at least one battery pack assembly 130. The electrified powertrain 104 is a hybrid powertrain that additionally includes an internal combustion engine (ICE) 140. As will be described herein, the electric motors 116 and the ICE 140 cooperate to selectively connect and disconnect with the driveline 108 to provide drive torque to drive wheels.

A vehicle control system 144 includes a controller 150 that can provide various inputs to the EDM 106 including torque requests based on signals received from a driver interface 160. In examples, the driver interface 160 can include a drive input device, e.g., an accelerator pedal 162, for providing a driver input, e.g., a torque request, to the controller 150 and ultimately the EDM 106. The driver interface 160 can further include a human machine interface (HMI) 164 for displaying driver information and receiving driver requests. The HMI 164 can include any interface that receives an input from the driver indicative of a desire of the driver to alter any parameter of the powertrain 104 such as a torque output. In some examples, the HMI can be arranged on a steering wheel of the electrified vehicle 100.

While the vehicle control system 144 is shown as a single controller 150, it will be appreciated that more controllers and/or modules, such as a supervisory electrified vehicle control module, a battery control module, a motor control module and a chassis stability module, and various additional controllers described herein can be utilized to control various vehicle components of the hybrid electric vehicle 100. In this regard, various controllers and modules are configured to communicate with each other, utilizing different sensor inputs 170 and calculated parameters as disclosed herein for controlling operation of the powertrain 104.

Figure 2:
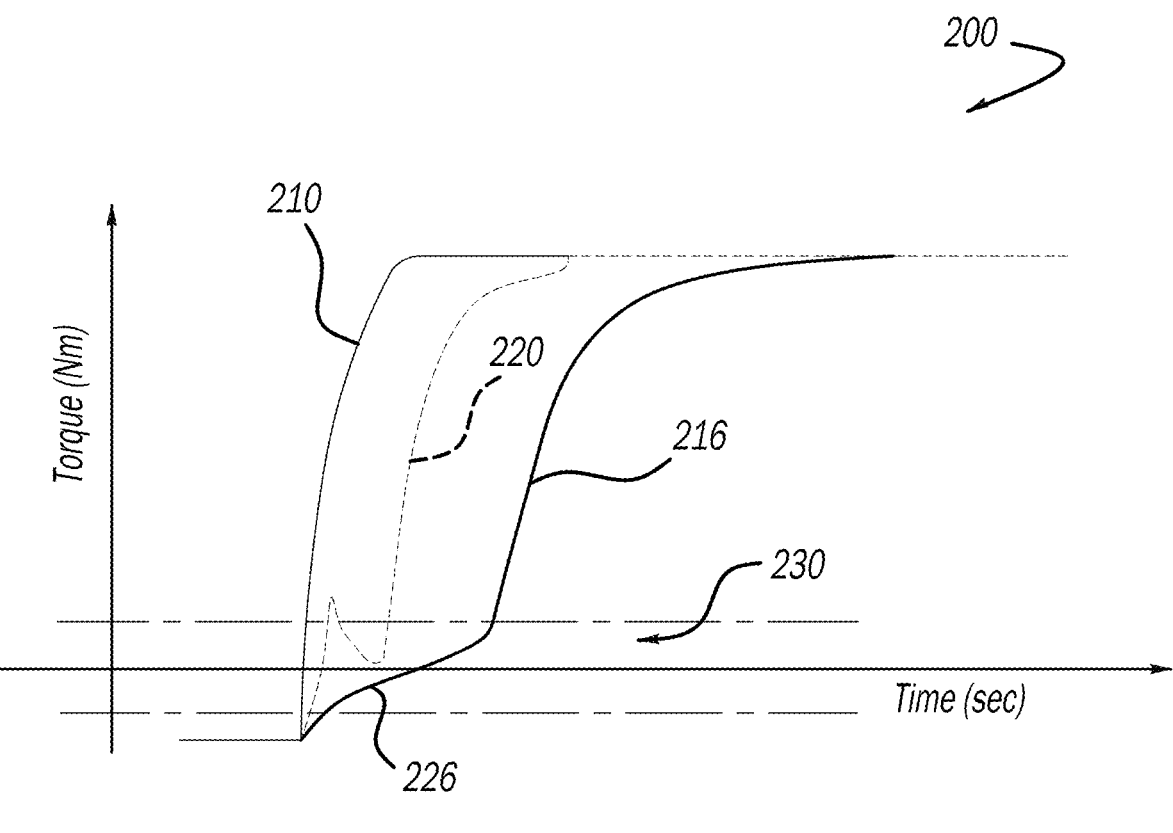
FIG. 2 is a plot of drive torque over time illustrating driver demand reference trajectory, traditional non-linear driver demand filtering and a model-based control according to one example of the present disclosure.

With additional reference now to FIG. 2, a plot 200 of drive torque over time illustrating driver demand reference trajectory 210, traditional non-linear driver demand filtering 216 and a model-based control 220 according to one example of the present disclosure. A lash zone 230 is defined as a backlash zone (space) between corresponding teeth of intermeshing gears in the powertrain (e.g., electric motors 116, etc.). Intermeshing gears in the powertrain can be any gears such as gear reduction gears and/or any gears between the electric motor 116 and the driveline 108.

Traditional solutions to active damping, such as the traditional non-linear driver demand filtering 216 involved two steps. The supervisory controller generated an optimal torque command using the minimum states of the system. This torque command underwent shaping through multiple filters at different parts of the system path. The input to the system, the driver demand, was shaped. The actuator commands, such as engine torque command and motor torque command, where shaped again as post-optimization outputs. Various types of shaping were applied, including one for controlling the powertrain at zero Newton meters (Mn) of torque or the lash zone within the transmission. Other shaping's controlled the system in its linear zone, where system stiffnesses could still be excited if not controlled appropriately. Of note, the traditional non-linear driver demand filtering 216 includes a small slope region 226 (reduced torque increase over time) where the lash zone 230 is crossed (the corresponding intermeshing teeth rotate from a non-contacting position to a contacting position). When the increasing torque is slow and smooth, the lash is mitigated. However, with the traditional non-linear driver demand filtering 216, the torque response that the driver desires is delayed.

As shown, the model-based control 220 provides a quick reaction (torque request is generated sooner compared to the traditional non-linear driver demand filtering 216), while still minimizing lash observed by the driver. With the system of the present disclosure, lash can be crossed much more quickly and climb in torque towards the driver intent within a time period shorter than the cascade of filters that are currently present in the traditional filtering 216.

Figure 3:
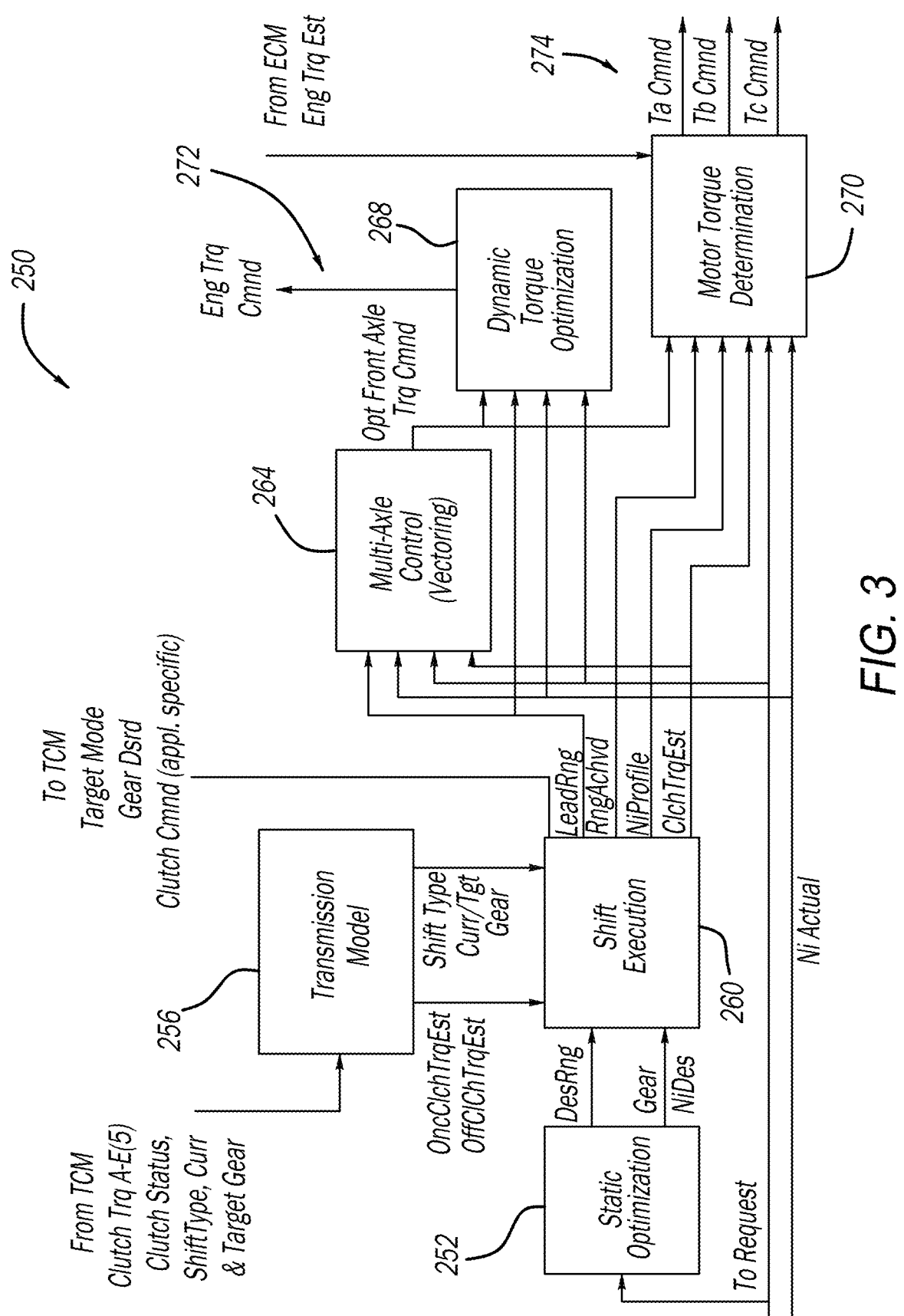
FIG. 3 is a functional block diagram of a hybrid supervisory control implemented by the controller of the hybrid electric vehicle of FIG. 1 according to one example of the present disclosure.

With additional reference now to FIG. 3, a functional block diagram of a hybrid supervisory control 250 implemented by the controller 150 of the hybrid electric vehicle 100 of FIG. 1 according to one example of the present disclosure will be described. The hybrid supervisory control 250 generally determines what torque is needed to deliver from a respective gear to the drive wheels. In examples, the hybrid supervisory control 250 can operate in open loop to provide a motor torque command.

The hybrid supervisory control 250 includes a static optimization module 252, a transmission model 256, a shift execution module 260, a multi-axle control vectoring module 264, a dynamic torque optimization module 268 and a motor torque determination module 270.

The static optimization module 252 employs iterative algorithms to systematically explores all possible powertrain state combinations, seeking the optimal configuration. The dynamic torque optimization module 268 iteratively adjusts torque commands to the ICE 140 and the electric motors 116 to identify the most suitable combination of powertrain actuators. The combination achieves the desired driver demand while concurrently governing various powertrain inertias to adhere to their prescribed speed trajectories. The dynamic torque module 268 outputs a torque command 272 to the ICE 140. The motor torque determination module 270 outputs torque commands 274 to the motors 116. In effect, the hybrid supervisory control 250 develops the driver demand reference trajectory 210 (drive torque requested 274 by the driver to the drive wheels), FIG. 2.

FIG. 4 is a functional block diagram of a supervisory motor torque control 300 implemented by the controller 150 of the hybrid electric vehicle 100 of FIG. 1 according to one example of the present disclosure. The supervisory motor torque control 300 generally a supervisory torque determination module 302 and a motor controller 304. The supervisory torque determination module 302 receives a driver demand shaping output 310, and a reported engine torque signal 312. The driver demand shaping output 310 can be generated from a driver demand shaping module 314 that receives a signal from the accelerator pedal 162.

The supervisory torque determination module 302 includes a rigid driveline model (TSTF) 320, an open loop electric motor torque calculation module 334, and an active damping controller 340. The active damping controller 340 includes an optimal state feedback controller 344 and an optimal state estimator 348. The open loop electric motor torque calculation 334 is explained above with respect to the hybrid supervisory control 250 of FIG. 3. The active damping controller 340 outputs modified torque commands 350 assigned to the respective electric motors 116. The modified torque commands 350 are also represented by the model based control trace 220 on FIG. 2. Further explanation of the operation of the active damping controller 340 is discussed below with respect to FIG. 6.

The MCP 304 includes an active electric motor dampening (AEMD) module 360 that receives the torque commands 350 and outputs modified torque actuation signals 370 to the respective electric motors 116. The MCP 304 provides measurement feedback 374 to the active damping controller 340.

Figure 5:
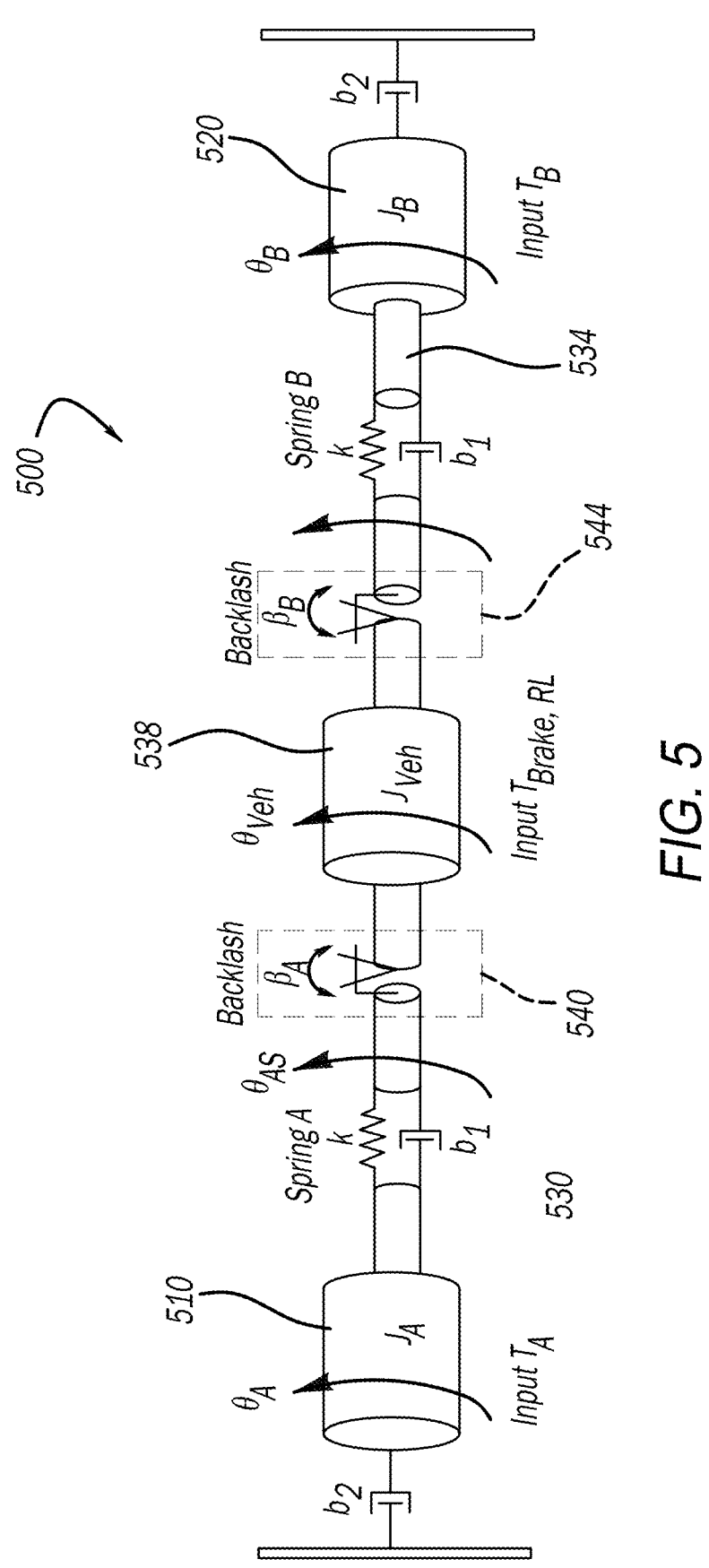
FIG. 5 is a schematic illustration of a generic powertrain of which the active damping control can be applied to according to various examples of the present disclosure.

FIG. 5 is a schematic illustration of a generic powertrain 500 of which the active damping control can be applied to according to various examples of the present disclosure. The powertrain 500 generally includes a first motor 510, a second motor 520, a first axle 530, a second axle 534 and a vehicle inertia 538. A first backlash non-linearity 540 is disposed generally between the first electric motor 510 and the vehicle inertia 538. A second backlash non-linearity 544 is disposed generally between the second electric motor 520 and the vehicle inertia 538. Both electric motors 510, 520 are represented by an inertia JA and JB, respectively with torques $T_A$ and $T_B$ acting on each inertia. Both electric motor's position is represented by $\theta_A$ and $\theta_B$. Each motor shaft 530, 534 entering backlash is denoted as $\theta_{AS}$ and $\theta_{BS}$. The vehicle's inertia is represented by $J_{Veh}$ with $T_{BrakeRL}$ acting on the vehicle's inertia. This torque represents the combination of friction brake torque and road load torque. The vehicles position is represented by $\theta_{Veh}$. Axle shafts connecting electric motors 510 and 520 to vehicle inertia are shown, having spring constant k and damping bi along with backlash angle $\beta_A$ and $\beta_B$ respectively.

Each motor shaft 530, 534 can be either in a contact state or within backlash. Contact states include both positive and negative contact, depending on the direction of the motor torque. This model can be represented in a time-varying state space form, thus having four distinct states: 1) all contact; 2) the first motor 510 in contact with the second motor 520 in backlash; 3) the first motor 510 in backlash with the second motor 520 in contact; and 4) both the first and second motors 510, 520 in backlash.

The dynamic equations of the system are described below:

$$T_A - J_A \ddot{\theta}_A - b_2 \dot{\theta}_A - k(\theta_A - \theta_{AS}) - b_1(\dot{\theta}_A - \dot{\theta}_{AS}) = 0$$

$$T_B - J_B \ddot{\theta}_B - b_2 \dot{\theta}_B - k(\theta_B - \theta_{BS}) - b_1(\dot{\theta}_B - \dot{\theta}_{BS}) = 0$$

$$k(\theta_A - \theta_{AS}) + b_1(\dot{\theta}_A - \dot{\theta}_{AS}) - T_{shaft,A} = 0$$

$$k(\theta_B - \theta_{BS}) - b_1(\dot{\theta}_B - \dot{\theta}_{BS}) - T_{shaft,B} = 0$$

$$T_{shaft,A} + T_{shaft,B} - J_{veh} \ddot{\theta}_{veh} - T_{Brake,RL} = 0$$

Consider backlash $\theta_{BA}$ and $\theta_{BB}$ with size $2\beta_A$ and $2\beta_B$ as follows:

$$\theta_{BA} = 2\beta_A = \theta_{AS} - \theta_{veh}$$

$$\theta_{BB} = 2\beta_B = \theta_{BS} - \theta_{veh}$$

Now, $\theta_{AS}$ and $\theta_{BS}$ in the equations above can be replaced by equations including backlash:

$$T_A - J_A \ddot{\theta}_A - b_2 \dot{\theta}_A - k(\theta_A - \theta_{BA} - \theta_{veh}) - b_1(\dot{\theta}_A - \dot{\theta}_{BA} - \dot{\theta}_{veh}) = 0$$

$$T_B - J_B \ddot{\theta}_B - b_2 \dot{\theta}_B - k(\theta_B - \theta_{BB} - \theta_{veh}) - b_1(\dot{\theta}_B - \dot{\theta}_{BB} - \dot{\theta}_{veh}) = 0$$

$$k(\theta_A - \theta_{BA} - \theta_{veh}) + b_1(\dot{\theta}_A - \dot{\theta}_{BA} - \dot{\theta}_{veh}) - T_{shaft,A} = 0$$

$$k(\theta_B - \theta_{BB} - \theta_{veh}) - b_1(\dot{\theta}_B - \dot{\theta}_{BB} - \dot{\theta}_{veh}) - T_{shaft,B} = 0$$

$$T_{shaft,A} + T_{shaft,B} - J_{veh} \ddot{\theta}_{veh} - T_{Brake,RL} = 0$$

From the above equations, one can see that two modes of operation exist for each shaft. A contact zone and backlash zone that is given by the following dynamics of the backlash state. Generalizing backlash dynamics for a shaft from above we get:

$$\theta_{BL} = \begin{cases} +\beta, & \dot{\theta}_B = 0 \to Postive \text{ Contact} \\ -\beta < \theta_B < +\beta, & \dot{\theta}_B = \dot{\theta}_{motor} - \dot{\theta}_{veh} \to \text{Backlash} \\ -\beta, & \dot{\theta}_B = 0 \to \text{Negative Contact} \end{cases}$$

In order to design an optimal controller, states variables that are intuitive and have easy reference trajectories are considered, the selection of these states is a crucial consideration since reference trajectories for these states are essential for the effective operation of the controller.

In modeling a powertrain using a two mass-spring-damper system, the conventional approach found in the literature, typically includes the position and velocity of the masses as states of the system. Additionally, intermediate states of actuators, such as engines with slower dynamics, are considered. However, defining reference trajectories for position states becomes exceedingly challenging, particularly when supervisory controls dictate the system should follow a two mass-rigidly coupled model.

One novel contribution to this architecture, is how we addressed this challenge and ensured that the selected state variables have clear physical interpretations, we have replaced position states with their equivalent spring torque states. This replacement facilitates the construction of 'intuitive' Q (state error weight) and R (input effort weight) matrices used in optimal control to appropriately weigh each state. As a result, the state variables chosen for optimization across all proposed control methods are as follows:

$$x = \begin{bmatrix} \dot{\theta}_A & \dot{\theta}_B & \dot{\theta}_V & T_{Spring,A} & T_{Spring,B} \end{bmatrix}^T$$

The desired reference trajectories for these states are derived from the simplified reference model plant utilized by the supervisory controller's torque path. This essentially means that the supervisory control can continue to use a model with limit states, thus managing to keep the additional complexity of lash control and stiffness control outside optimization algorithms which would have required extremely high computational burden. In this reference model, motor speed outputs are readily available, and shaft torques are assumed to be equal to the torque transmitted by the rigid shaft connecting the motor actuators to vehicle inertia, or in other words, the output of supervisory control without the excessive filtering.

Continuing from above, for this purpose, spring torques are defined as below:

$$T_{spring,A} = k(\theta_A - \theta_{BA} - \theta_{veh})$$

$$T_{spring,B} = k(\theta_B - \theta_{BB} - \theta_{veh})$$

From the above equations, a continuous time-varying state-space model can be written, as below:

$$\dot{x} = A_C(t) \cdot x(t) + B_C(t) \cdot u(t)$$

$$y = C_C(t) \cdot x(t) + D_C(t) \cdot u(t)$$

Consider that in positive and negative contact, e BL is a constant value, with $\theta_{BL}' = 0$, the state-space matrices simplify down to 5 states from the linear model in the section above, since the states include spring torque and not position of the electric machines.

When a shaft is in backlash, the system equations simplify down due to the following:

$$T_{shaft,M} = k(\theta_M - \theta_{MA} - \theta_{veh}) + b_1(\dot{\theta}_M - \dot{\theta}_{MA} - \dot{\theta}_{veh}) = 0$$

Where 'M' signifies either motor A or B from the system above.

Thus, the continuous time state-space matrices for the system with both motors in backlash with the same states as used by the contact model is the following:

$$A_C = \begin{bmatrix} -\dfrac{b_2}{J_A} & 0 & 0 & 0 & 0 \\ 0 & -\dfrac{b_2}{J_B} & 0 & 0 & 0 \\ 0 & 0 & 0 & 0 & 0 \\ 0 & 0 & 0 & 0 & 0 \\ 0 & 0 & 0 & 0 & 0 \end{bmatrix}$$

$$B_C = \begin{bmatrix} \dfrac{1}{J_A} & 0 & 0 \\ 0 & \dfrac{1}{J_B} & 0 \\ 0 & 0 & \dfrac{1}{J_{Veh}} \\ 0 & 0 & 0 \\ 0 & 0 & 0 \end{bmatrix}$$

$$C_C = \begin{bmatrix} 1 & 0 & 0 & 0 & 0 \\ 0 & 1 & 0 & 0 & 0 \\ 0 & 0 & 1 & 0 & 0 \end{bmatrix}$$

$$D_C = [\,0 \quad 0 \quad 0\,]$$

$$x = \begin{bmatrix} \dot{\theta}_A & \dot{\theta}_B & \dot{\theta}_{veh} & T_{Spring,A} & T_{Spring,B} \end{bmatrix}^T$$

$$u = [\,T_A \quad T_B \quad T_{Brake,RL}\,]^T$$

Consider that there are two modes of the system, like mentioned above where a single motor is in backlash while the other motor is in contact. Thus, you can write two other state space formulations of the plant consisting of various combinations of the equations above.

Considering the control strategies described will be deployed in an embedded processor, the driveline's dynamic model must be discretized. Care must be taken to consider numerical integration errors that can take place when calculating position in backlash from the equations above. To avoid such errors when integrating speed signals from above and to keep the states of position aligned with the states of spring torque, further limitation is applied to the position $\theta_A$ and $\theta_B$ using the spring torque equation from above, where the output of the spring torque state, is used to limit the calculation of motor position. Consider that the spring torque equations is always continuous across all modes of the system, in contact or in backlash.

Figure 6:
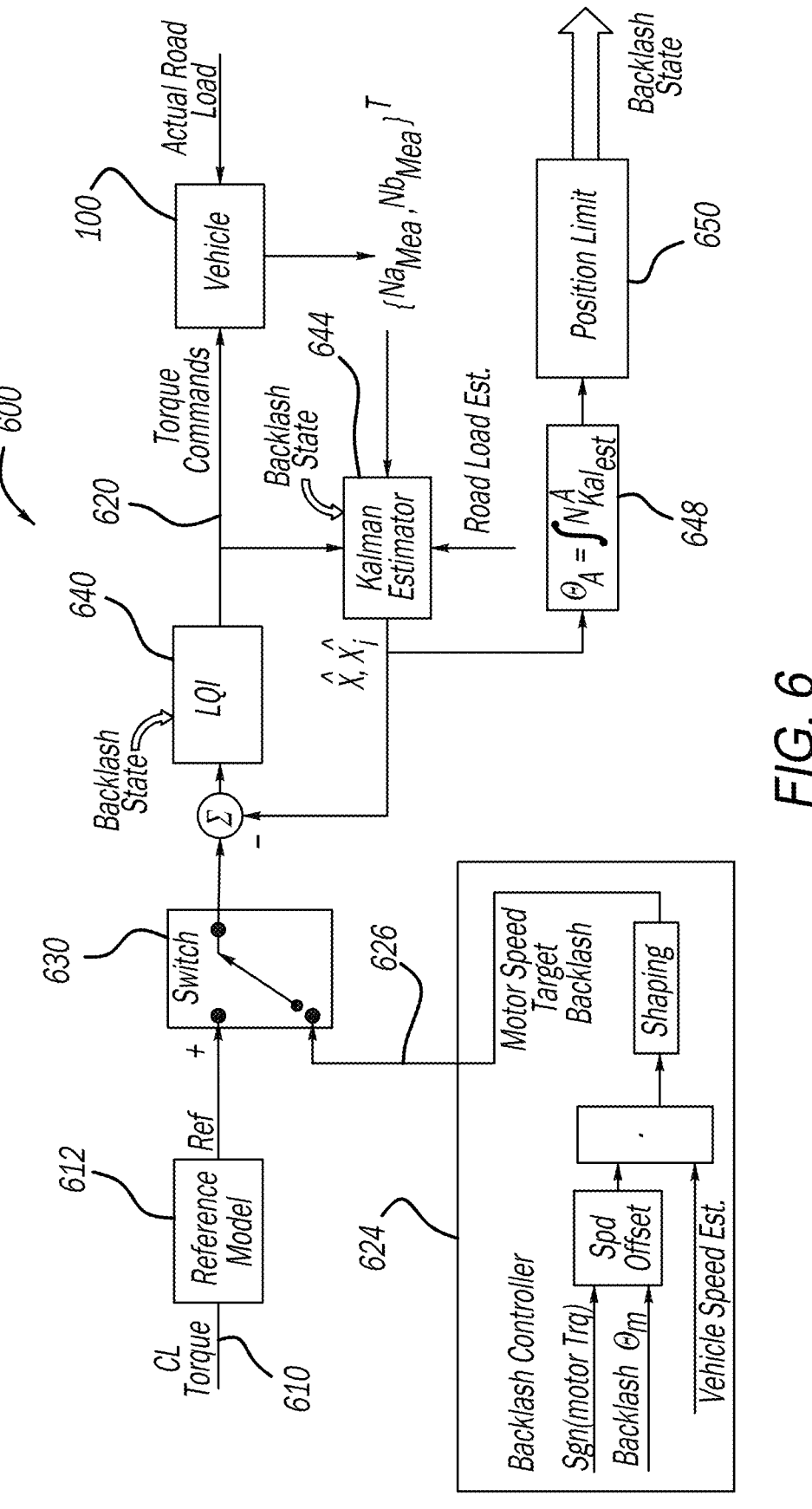
FIG. 6 illustrates an exemplary control flow diagram of steps carried out by the controller of FIG. 1 while implementing the active damping control according to various examples of the present disclosure.

FIG. 6 illustrates an exemplary controller 600 that implements the active damping control according to various examples of the present disclosure. Again, the controller 600 can be incorporated into or cooperate with the controller 150, FIG. 1. In general, the exemplary control method 600 is carried out by the active damping controller 340 (FIG. 4). A CL torque 610 is received by a reference model 612. The CL torque 610 represents the driver demand reference trajectory 210, FIG. 2 (driver requested torque, open loop). Torque commands 620 represents the traditional non-linear driver demand filtering 216 (FIG. 2). A switch 630 receives an output from the reference model 612 and a motor speed target backlash 626 from a backlash controller 624. A linear Quadratic Integral (LQI) controller 640 takes the estimated states, compares them to the reference states, and generates torque commands to prevent and compensate for any oscillations/vibrations within the system. A Kalman Estimator 644 provides necessary feedback of the state variables for the functioning of the LQI controller 640. An integral controller 648 provides an input to a position limit module 650 that in turn provides an output of the backlash state.

The controller 600 has four states. Based on the state of the backlash, four LQI controllers are created with the following formulation:

$$u(k) = K_{LQI_{BL}}(x_{ref}(k) - \hat{x}(k)) + K_{LQI_{BL}}^i \left( x_{ref}^i(k) - \hat{x}^i(k) \right)$$

with:

$$K_{LQI_{BL}} = \begin{cases} K_{LQI_{BL}}, & |\theta_{BL_A}| \geq \beta_A \text{ and } |\theta_{BL_B}| \geq \beta_B \\ K_{LQI_{BL}}^{A-lash}, & |\theta_{BL_A}| < \beta_A \text{ and } |\theta_{BL_B}| \geq \beta_B \\ K_{LQI_{BL}}^{B-lash}, & |\theta_{BL_A}| \geq \beta_A \text{ and } |\theta_{BL_B}| < \beta_B \\ K_{LQI_{BL}}^{both-lash}, & |\theta_{BL_A}| < \beta_A \text{ and } |\theta_{BL_B}| < \beta_B \end{cases}$$

Where $\theta_{BL}$ is the backlash angle of each motor respective shaft and $\beta$ denotes the size of backlash present on the geartrain.

Same process for the integral term where those values are computed offline using the four different linear models:

$$x(k+1) = A_{BL}x(k) + B_{BL}u(k)$$

$$y(k) = C_{BL}x(k) + D_{BL}u(k)$$

Consider that in the full non-linear backlash case, there are 4 different A, B, C and D matrices of the system since the entire state equations change depending on whether a motor is in contact or not.

Note that the optimal observer (Kalman filter) used with this backlash LQI also has an equivalent linear switching mode formulation that is being designed using the models above and switch in a synchronous way with the LQI controller. Since the observability of the system changes in each mode, the Kalman estimator is carefully created in each mode. In general, speed states of the motor shaft in backlash are kept as part of the plant to be estimated, with spring torque removed as the non-observable state. Thus, a consistent formulation and size of the gains is maintained where the measurable outputs are the same across all states of the system. Controllability of the system also remains key in formulating the LQI controller. Like the estimator, the non-observable and non-controllable states of the system are removed when creating the LQI gains in each mode. In general, speed states remain part of the controller and spring torques are removed as control variable when the system is in backlash. However, the size and formulation of the matrices like the estimator are kept constant across all modes of operation, to aid in simplicity of implementation in embedded code.

In order to calculate the backlash dynamics, speed estimates from the Kalman are integrated to calculate the position of each mass in the model. A simple forward Euler method of integration is used as shown below to calculate position:

$$\theta_A(k+1) = \theta_A(k) + \dot{\theta}_A \cdot dT$$

$$\theta_B(k+1) = \theta_B(k) + \dot{\theta}_B \cdot dT$$

$$\theta_{Veh}(k+1) = \theta_{Veh}(k) + \dot{\theta}_{Veh} \cdot dT$$

11

To avoid issues with numerical precision due to discrete integration, the spring torque equation was used for each shaft to limit the calculated position of each motor in relation to vehicle position. Thus, the calculated backlash position of each motor remained synchronous with the Kalman estimator spring torque and thus its mode of operation and dynamics. By switching modes as the system entered backlash, along with guaranteeing that backlash position is calculated using spring torque, the system enters no-contact state of operation when spring torque reaches zero.

$$\theta_A(k) \begin{cases} \max\left(\dfrac{T_{spring,A}(k)}{k} + \theta_{veh} - \beta_A, \theta_A\right) \\ \min\left(\dfrac{T_{spring,A}(k)}{k} + \theta_{veh} + \beta_A, \theta_A\right) \end{cases}$$

$$\theta_B(k) \begin{cases} \max\left(\dfrac{T_{spring,B}(k)}{k} + \theta_{veh} - \beta_B, \theta_B\right) \\ \min\left(\dfrac{T_{spring,B}(k)}{k} + \theta_{veh} + \beta_B, \theta_B\right) \end{cases}$$

Control during backlash is achieved by the speed target prescribed by the user. This speed target is calculated as an offset above vehicle speed in the direction of the desired backlash angle that is determined based on the sign of target motor torque from the hybrid supervisory controller. The general principle is commanding a higher offset when on the opposite side of backlash, followed by a reduction in speed offset as the contact zone gets closer. This allows the controller to accelerate during initial lash crossing and pull back to avoid harsh contact towards the end.

Figure 7:
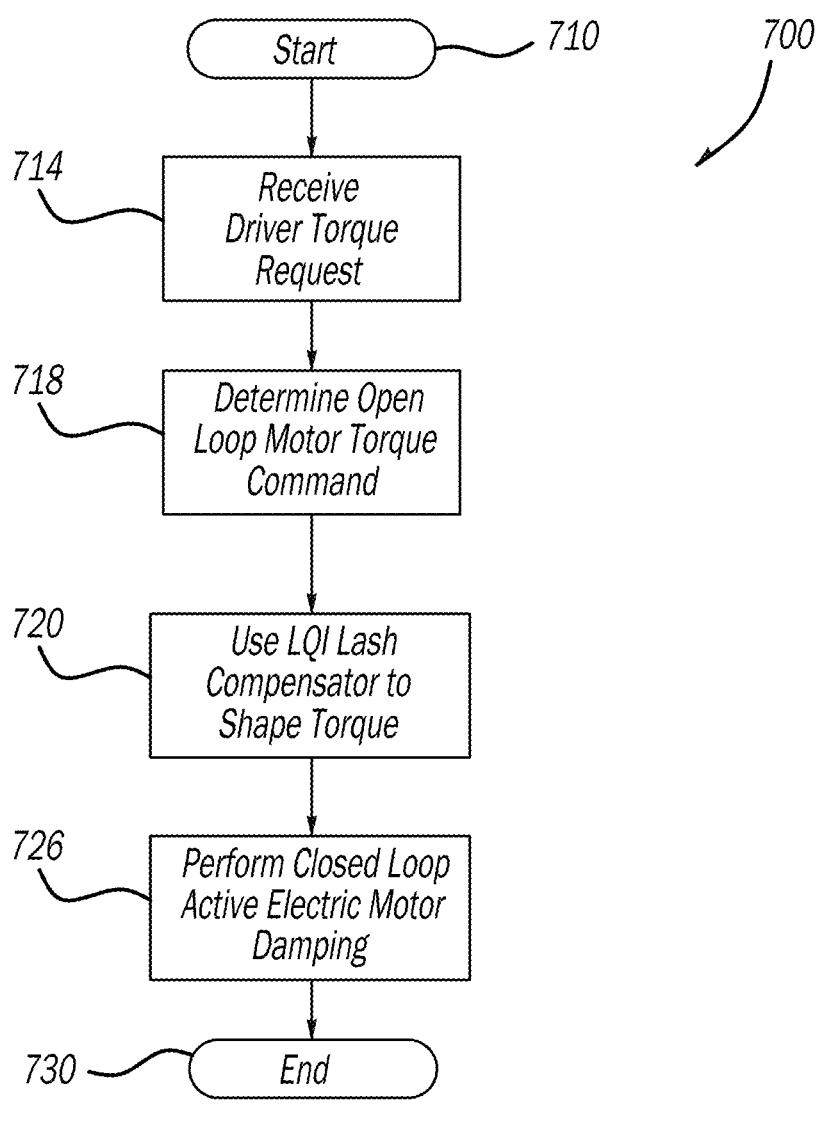
FIG. 7, a control method according to the present disclosure for performing active damping control in a hybrid vehicle.

With reference now to FIG. 7, a control method according to the present disclosure for performing active damping control in a hybrid vehicle is shown and generally identified at reference 700. Control starts at 710. At 714 control receives a driver torque request. The driver torque request can be based on a signal provided by accelerator pedal 162. At 718 control determines an open loop motor torque command based on the signal provided by the accelerator pedal 162. At 720, control receives the open loop torque at the LQI lash compensator 620 to shape the torque command to cross the lash zone 230 (FIG. 2) quickly (see 220 versus 216), but without causing "banging" or NVH into the system (initial contact or landing of the teeth of complementary gears is done softly). Again, crossing the lash zone represents moving respective gear teeth of complementary gears from a non-contact position (gap) into contact with each other. Once in contact (complementary gear teeth within the system are touching without gap), torque is delivered without introducing unwanted forces into the system. In other words, energy that may bounce back from a drive wheel through a shaft (e.g., 530, 534) is minimized to an acceptable level. At 726, control performs closed loop AEMD using the AEMD 360 at the MCP 304 (FIG. 4). The closed loop AEMD eliminates every residual oscillations. In other words, the AEMD 360 considers the oscillations present in the system and adjusts torque to minimize oscillations to an acceptable level. Reference trajectories for the system are created based on controlling motor speed through backlash, to achieve a "smooth landing" into positive or negative contact on the other side.

Due to the iterative nature of these algorithms, careful consideration is given to defining the powertrain plant (e.g., ICE 140, electric motors 116) under control, minimizing the number of state variables to reduce the computational load on the vehicle's embedded processors. However, a significant challenge arises when incorporating active damping, which necessitates the consideration of stiffness, damping, and additional individual inertias, into this common generic hybrid control architecture. This integration must occur without growing complexity or increasing the number of states utilized in the optimization process. The methodology that solves this challenge primarily resides within the supervisory motor torque determination architecture discussed below with respect to FIG. 4.

As used herein, the term controller or module refers to an application specific integrated circuit (ASIC), an electronic circuit, a processor (shared, dedicated, or group) and memory that executes one or more software or firmware programs, a combinational logic circuit, and/or other suitable components that provide the described functionality.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present application, its application or uses. Thus, variations that do not depart from the gist of the present application are intended to be within the scope of the present application.

What is claimed is:

1. An electrified powertrain that generates and transfers drive torque to a driveline of a hybrid electric vehicle, the electrified powertrain comprising:
   a first electric motor having a first electric motor output;
   a second electric motor having a second electric motor output;
   a controller configured to:
      receive a driver torque request;
      determine an open loop motor torque command based on the driver torque request; and
      determine a shaped torque command based on the open loop motor torque command, including identifying a lash zone, requesting motor torque from at least one of the first and second electric motors to cross the lash zone, and, subsequent to crossing the lash zone, providing motor torque to meet the driver torque request.

2. The electrified powertrain of claim 1, wherein the controller is further configured to:
   perform closed loop active electric motor damping of at least one of the first and second electric motors.

3. The electrified powertrain of claim 1, wherein the controller further comprises:
   a supervisory motor torque determination module that (i) receives a driver demand shaping signal based on the driver torque request and (ii) an engine torque signal.

4. The electrified powertrain of claim 3 wherein the supervisory motor torque determination module further comprises an active damping controller that (i) receives the open loop motor torque command and (ii) outputs the shaped torque command to at least one of the first and second electric motors.

5. The electrified powertrain of claim 4, wherein the controller further comprises:
   a motor controller including an active electric motor dampening (AEMD) module that receives the shaped torque command and outputs modified torque actuation signals to the respective first and second electric motors.

6. The electrified powertrain of claim 5 wherein the motor controller implements a closed loop speed control that mitigates residual oscillations in the electrified powertrain.

7. The electrified powertrain of claim 1, further comprising:

a supervisory motor torque determination module implements a linear quadratic integral (LQI)-based compensator that provides the shaped torque command.

8. The electrified powertrain of claim 1, further comprising:

an internal combustion engine (ICE).

9. A method for controlling an electrified powertrain that generates and transfers drive torque to at least one of a first and second electric motor in a driveline of a hybrid electric vehicle, the method comprising:

receiving a driver torque request;

determining an open loop motor torque command based on the driver torque request;

determining a shaped torque command based on the open loop motor torque command, including identifying a lash zone; and requesting motor torque from at least one of the first and second electric motors to cross the lash zone, and, subsequent to crossing the lash zone, providing motor torque to meet the driver torque request.

10. The method of claim 9, further comprising:

performing closed loop active electric motor damping of at least one of the first and second electric motors.

11. The method of claim 9, further comprising:

receiving, at a supervisory motor torque determination module, (i) a driver demand shaping signal based on the driver torque request and (ii) an engine torque signal.

12. The method of claim 11, further comprising:

receiving, at an active damping controller, the open loop motor torque command; and outputting the shaped torque command to at least one of the first and second electric motors.

13. The method of claim 12, further comprising:

receiving, at a motor controller including an active electric motor dampening (AEMD) module, the shaped torque command; and outputting modified torque actuation signals to the respective first and second electric motors.

14. The method of claim 13, further comprising:

implementing a closed loop speed control that mitigates residual oscillations in the electrified powertrain.

15. The method of claim 9, further comprising:

implementing, at a supervisory motor torque determination module, a linear quadratic integral (LQI)-based compensator that provides the shaped torque command.

* * * * *